(12) United States Patent
Ikebe et al.

(10) Patent No.: US 6,301,078 B1
(45) Date of Patent: Oct. 9, 2001

(54) DISC CARTRIDGE AND SHUTTER

(75) Inventors: Masaru Ikebe; Yukio Miyazaki, both of Nagano (JP)

(73) Assignee: TDK Corporation (JP)

( * ) Notice: Subject to any disclaimer, the term of this patent is extended or adjusted under 35 U.S.C. 154(b) by 0 days.

(21) Appl. No.: 09/121,459

(22) Filed: Jul. 23, 1998

(30) Foreign Application Priority Data

Jul. 25, 1997 (JP) .................................... 9-213865

(51) Int. Cl.[7] .................................... G11B 23/03
(52) U.S. Cl. ............................ 360/133; 369/291
(58) Field of Search ............... 360/133; 369/291

(56) References Cited

U.S. PATENT DOCUMENTS

| 4,849,844 | 7/1989 | Kato | 360/133 |
| 5,786,969 | * 7/1998 | Fukushima et al. | 360/133 |
| 5,805,566 | * 9/1998 | Kobayashi | 360/133 |
| 5,822,297 | * 10/1998 | Fujisawa | 360/133 |

FOREIGN PATENT DOCUMENTS

| 0 353 000 A2 | 1/1990 | (EP) . |
| 0 502 702 A1 | 9/1992 | (EP) . |
| 8-335382 | 12/1996 | (JP) . |

* cited by examiner

*Primary Examiner*—Brian E. Miller
(74) *Attorney, Agent, or Firm*—Lerner, David, Littenberg, Krumholz & Mentlik, LLP

(57) ABSTRACT

A disc cartridge capable of ensuring smooth sliding of a shutter on a casing while keeping a connection plate of the shutter from being abutted against or in contact with the casing, leading to a safe and increased-in-reliability sliding operation of the shutter. A lower plate of the shutter is provided with a holding pawl and a lower casing member is formed on an outer surface thereof with a slide groove, in which the holding pawl is slidably fitted. A side surface of the lower casing member on which the connection plate of the shutter is slid is outwardly projected beyond a side surface of an upper casing member on which the connection plate is likewise slid. Alternatively, the shutter is so formed that a bending angle between the lower plate and the connection plate is larger than that between an upper plate and the connection plate.

5 Claims, 3 Drawing Sheets

DISC CARTRIDGE AND SHUTTER

BACKGROUND OF THE INVENTION

This invention relates to a disc cartridge, and more particularly to a disc cartridge having a disc-like medium such as an optical disc, a magneto-optical disc or the like rotatably received in a casing and including a shutter arranged so as to selectively close openings of the casing which permits a recording/reproducing device of a recording/reproducing apparatus to be accessible to the disc-like medium.

In general, a disc cartridge having a disc-like medium such as, for example, a magnetic disc, an optical disc, a magneto-optical disc or the like received therein is kept charged in a recording/reproducing apparatus in use. Unfortunately, such a disc cartridge conventionally tends to readily cause adhering of dust or the like thereto and damage thereto during handling thereof. Also, it is substantially affected by a variation in temperature. Thus, the disc cartridge typically includes a shutter slidably arranged so as to hold openings of the casing such as a head insertion hole, a drive shaft insertion hole and the like open in use and hold them closed in non-use.

In the conventional disc cartridge including such a shutter as described above, the shutter is adapted to be slid on an outer surface of the casing. For this purpose, the shutter includes an upper plate arranged so as to be opposite to an outer surface of an upper casing member and a lower plate opposite to that of a lower casing member, as well as a connection plate for connecting the upper and lower plates to each other therethrough, resulting in being formed to have a substantially U-shape in section. The lower plate is provided thereon with two holding pawls in a manner to be spaced from each other at a predetermined interval in a direction of sliding of the shutter. The holding pawls are engagedly fitted in a recessed slide groove of the lower casing member to guide sliding of the shutter on the casing and prevent dislocation of the shutter therefrom. Also, the upper and lower casing members are so formed that side surfaces thereof opposite to an inner surface of the connection plate of the shutter are flush with each other and the upper and lower plates are bent at substantially the same angle from the connection plate.

Nevertheless, the side surface of the upper casing member is often caused to be outwardly projected as compared with the side surface of the lower casing member due to a variation in dimensions of molding dies for the casing and shutter, a variation in molding conditions thereof, a slight amount of misregistration between the upper casing member and the lower casing member during assembling of the disc cartridge, and the like. Also, the conventional disc cartridge causes an angle of bending of the upper plate from the connection plate to be increased as compared with that of the lower plate therefrom. This causes each of the holding pawls provided on the lower plate of the shutter to be caught on an inner surface of the slide groove and the connection plate to be caught on the side surface of the upper casing member, leading to a failure in smooth sliding of the shutter on the casing. Also, it hinders smooth mounting of the shutter on the casing, resulting in assembling of the disc cartridge being deteriorated.

SUMMARY OF THE INVENTION

The present invention has been made in view of the foregoing disadvantages of the prior art.

Accordingly, it is an object of the present invention to provide a disc cartridge which is capable of ensuring smooth sliding of a shutter on a casing irrespective of a variation in dimensions of a portion of a casing on which the shutter is mounted, a variation in angles of bending of the shutter and the like.

It is another object of the present invention to provide a disc cartridge which is capable of exhibiting increased reliability in operation thereof.

It is a further object of the present invention to provide a disc cartridge which is capable of enhancing safety and reliability in both assembling and operation of the disc cartridge.

It is still another object of the present invention to provide a disc cartridge which is capable of facilitating manufacturing thereof while preventing an increase in manufacturing cost thereof.

In accordance with the present invention, a disc cartridge is provided. The disc cartridge includes a casing constituted of an upper casing member and a lower casing member, and a disc-like medium rotatably received in the casing. The casing is provided with openings through which a recording/reproducing device is accessible to the disc-like medium. The disc cartridge also includes a shutter constructed of an upper plate, a lower plate and a connection plate for connecting the upper and lower plates therethrough and formed to have a substantially U-shape in section. The upper and lower plates are movably supported on the casing and moved in slide recesses formed on an outer surface of the casing to selectively close the openings. The lower plate of the shutter is provided with a holding pawl and the lower casing member is formed on an outer surface thereof with a slide groove, so that the holding pawl of the lower plate is slidably fitted in the slide groove of the lower casing member. Also, the upper and lower casing members are so formed that a side surface of the lower casing member on which the connection plate of the shutter is slid is outwardly projected toward the connection plate of the shutter beyond a side surface of the upper casing member on which the connection plate is likewise slid.

Alternatively or additionally, the shutter may be so formed that a bending angle between the lower plate and the connection plate is larger than that between the upper plate and the connection plate.

In a preferred embodiment of the present invention, the connection plate of the shutter is provided thereon with a bent element in a manner to inwardly extend therefrom and the upper and lower casing members of the casing are formed on the side surfaces thereof with a recess. The bent element of the connection plate is inserted in the recess of the side surfaces of the upper and lower casing members while being abutted against a recess forming portion of the lower casing member, whereby the shutter is slidably arranged on the casing while straddling the upper and lower casing members.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a disc cartridge according to the present invention will be described hereinafter with reference to the accompanying drawings.

Figure 1:
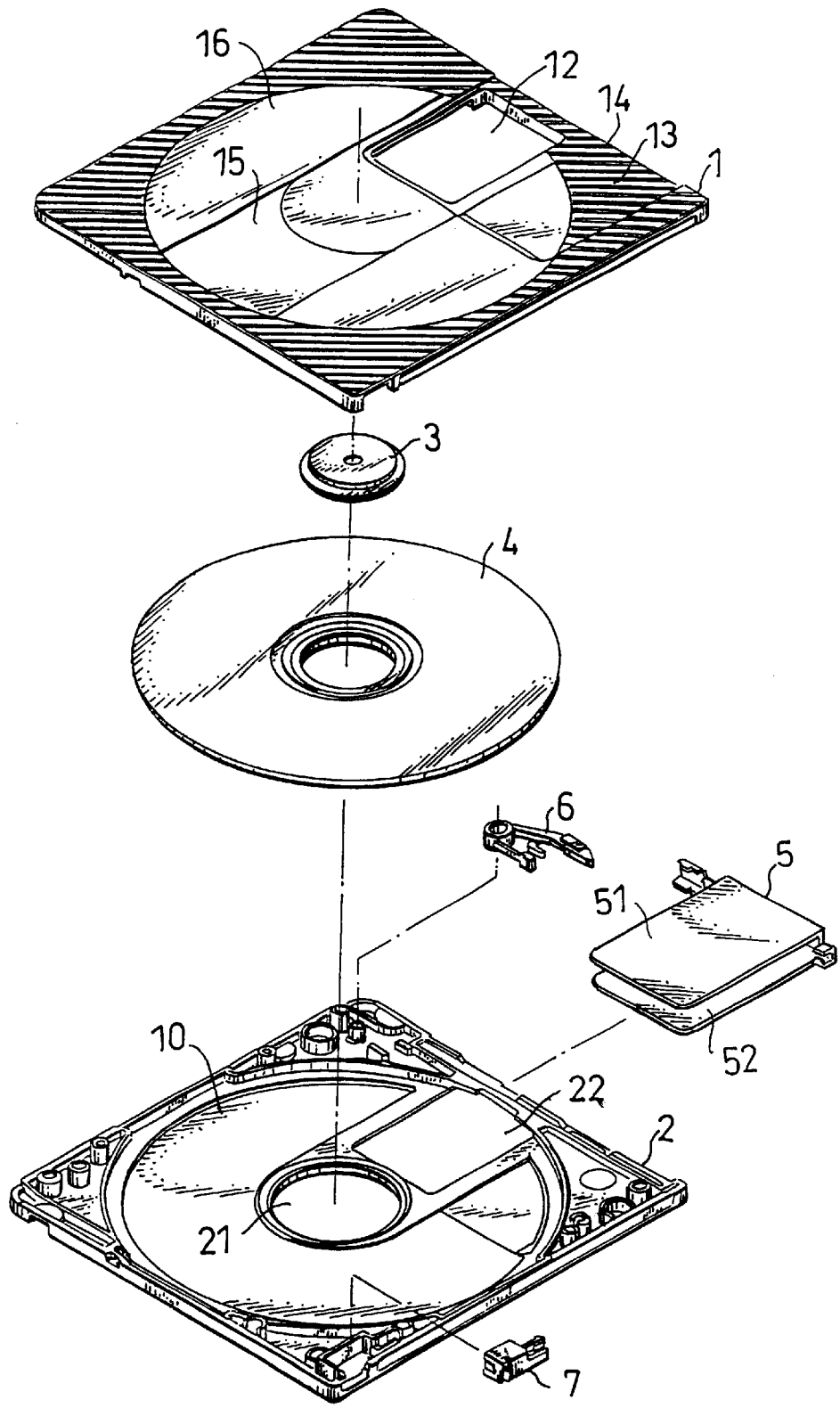
FIG. 1 is an exploded perspective view showing an embodiment of a disc cartridge according to the present invention.
Figure 2A:
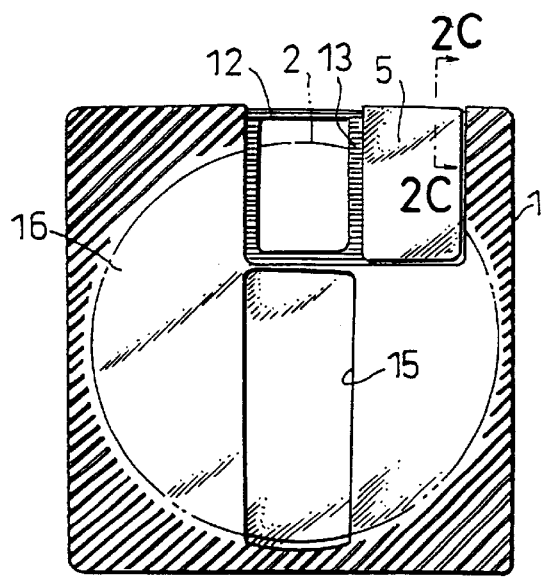
FIG. 2A is a plan view showing arrangement of a shutter on a casing in the disc cartridge of FIG. 1.
Figure 2B:
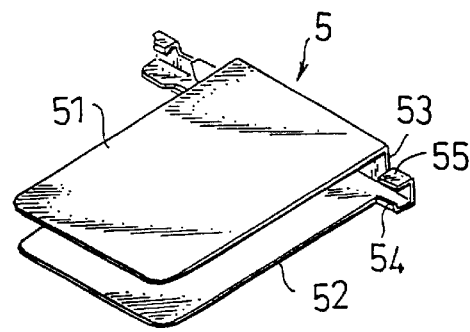
FIG. 2B is a perspective view showing the shutter.
Figure 2C:
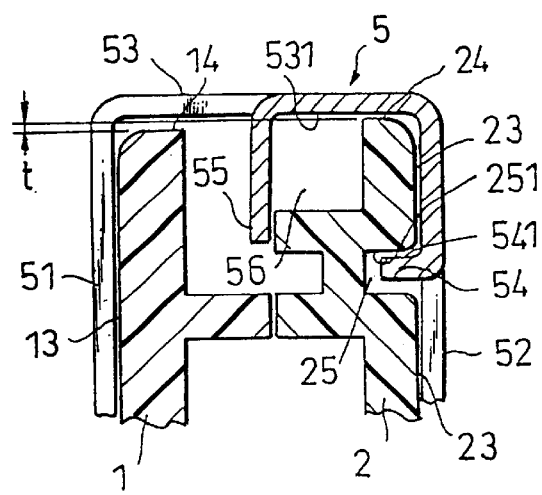
FIG. 2C is a fragmentary enlarged vertical sectional view taken along line 2C—2C of FIG. 2A.
Figure 2D:
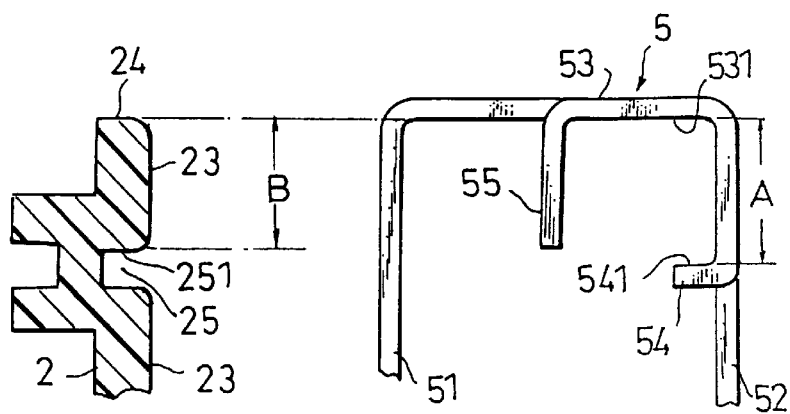
FIG. 2D is a fragmentary enlarged vertical sectional view showing relationship between the shutter and a lower casing member.
Figure 3A:
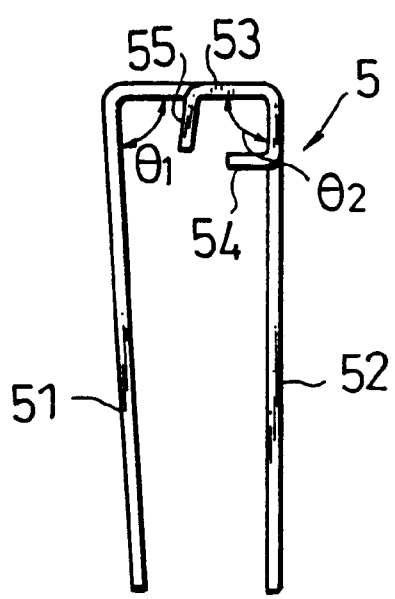
FIG. 3A is an enlarged side elevation view showing a modification of the shutter shown in FIG. 2A.
Figure 3B:
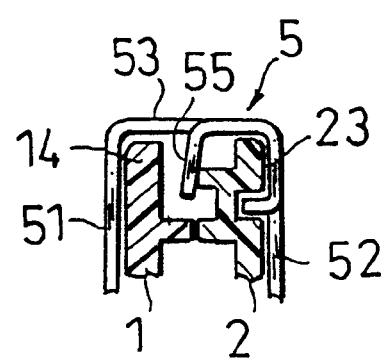
FIG. 3B is a fragmentary enlarged vertical sectional view showing the shutter of FIG. 3A mounted on a casing.

Referring to FIGS. 1 to 3B, an embodiment of a disc cartridge according to the present invention is illustrated. A disc cartridge of the illustrated embodiment includes a casing constructed of an upper casing member 1 and a lower casing member 2, as well as a disc-like medium 4 rotatably received in the casing with a clamping plate 3 so as to act as an information medium. The casing is formed with openings 12, 21 and 22 such as head insertion holes, a drive shaft insertion hole thereof and the like. The disc cartridge also includes a shutter 5 formed to have a substantially U-shape in section and slidably mounted on the casing so as to selectively close the openings 12 and 22. The casing is formed on an outer surface thereof with shutter sliding surface portions in a manner to be recessed therefrom, on which the shutter 5 is slidably supported. More specifically, the upper casing member 1 and lower casing member 2 are formed on an outer surface thereof with upper and lower shutter sliding surface portions 13 and 23, respectively. The shutter 5 includes an upper plate 51 and a lower plate 52 for selectively opening and closing the openings 12 and 22, as well as a connection plate 53 for connecting the upper and lower plates 51 and 52 to each other therethrough. The lower plate 52 of the shutter 5 is provided with a holding pawl 54 and correspondingly the lower casing member 2 of the casing is formed on the outer surface thereof with a slide groove 25, in which the holding pawl 54 is slidably fitted. The upper and lower casing members 1 and 2 have side surfaces 14 and 24 on which the connection plate 53 of the shutter 5 is slid, respectively. The side surface 24 of the lower casing member 2 is formed so as to be outwardly projected by a distance t toward the connection plate 53 beyond the side surface 14 of the upper casing member 1. Alternatively or additionally, as shown in FIGS. 3A and 3B, the shutter 5 may be so constructed that a bending angle θ2 between the lower plate 52 and the connection plate 53 is larger than that θ1 between the upper plate 51 and the connection plate 53.

The casing is provided therein with a shutter lock 6, which is engaged with the shutter 5 to normally lock it at a position at which it holds the openings 12 and 22 closed. The casing is also provided therein with an erasure preventing plug 7 so as to prevent miserasure of information recorded in the disc-like medium or overrecording thereon. To this end, the erasure preventing plug 7 is constructed so as to selectively keep the disc-like medium recordable or non-recordable as desired. Also, the slide groove 25 acting to guide sliding of the shutter 5 on the casing is provided on the outer surface of the lower casing member 2 in a manner to extend in the direction of movement or sliding of the shutter 5. Further, the connection plate 53 of the shutter 5 through which the upper plate 51 and lower plate 52 are connected together is provided thereon with a bent element 55 in a manner to inwardly extend therefrom. Correspondingly, the upper and lower casing members 1 and 2 are formed on the side surfaces thereof with a recess 56, in which the bent element 55 is inserted while being abutted against an upper surface of a recess forming portion of the lower casing member 2.

The shutter 5, as detailedly shown in FIGS. 2A to 2D, includes the upper plate 51, lower plate 52 and connection plate 53 and is arranged on the casing so as to be slid thereon while straddling the upper and lower casing members 1 and 2. The holding pawl 54 provided on the lower plate 52 of the shutter 5 is fitted in the slide groove 25 arranged in proximity to the side or end surface 24 of the shutter sliding surface 23 of the lower casing member 2.

The upper casing member 1 and lower casing member 2 are formed so that the side or end surface 24 of the lower casing member 2 is outwardly projected beyond the side or end surface 14 of the upper casing member 1. Also, the upper and lower casing members 1 and 2 are so formed that a distance A between an inner surface 541 of the holding pawl 54 of the shutter 5 and an inner surface 531 of the connection plate 53 is somewhat larger than a distance B between the side surface 24 of the lower casing member 2 and a side surface 251 of the slide groove 25 positioned on a side thereof near the side surface 24, to thereby ensure smooth sliding of the shutter 5. Further, the upper casing member 1 is formed so as to define a gap between the side surface 14 of the upper casing member 1 and the inner surface 531 of the connection plate 53 of the shutter 5. Such construction of the casing and shutter effectively prevents the side surface 14 of the upper casing member 1 from being caught on the inner surface of the shutter 5 and a portion of the lower casing member 2 between the side surface 24 of the lower casing member 2 and the side surface 251 of the slide groove 25 being caught between the inner surface 531 of the connection plate 53 of the shutter 5 and the holding pawl 54 irrespective of a variation in dimensions of the upper and lower casing members 1 and 2 due to unevenness in manufacturing thereof and a slight amount of misregistration between the upper casing member 1 and the lower casing member 2 during assembling thereof.

The shutter 5 shown in FIGS. 3A and 3B is so constructed that the bending angle θ2 between the lower plate 52 of the shutter 5 and the connection plate 53 is larger than a bending angle θ1 between the upper plate 51 and the connection plate 53 (θ2>θ1). Such construction permits the upper plate 51 to be abutted or pressed against the casing at increased force as compared with the lower plate 2, to thereby prevent the shutter 5 from being caught on the casing and/or shaving the casing irrespective of a variation in dimensions of the casing, a variation in angles of bending of the shutter and the like, so that the disc cartridge may exhibit increased reliability in operation thereof and enhance safety and reliability in both assembling and operation of the disc cartridge.

In the drawings, reference numeral 10 designates a disc-like medium receiving section formed in the casing, 15 is a label area, 16 is a visible section and 21 is the drive shaft insertion hole.

The casing may be constructed in any suitable manner depending on a disc-like medium to be received therein such as a floppy disc, a compact disc, a video disc, an optical disc or the like.

As can be seen from the foregoing, the disc cartridge of the present invention is so constructed that the lower plate of the shutter is provided with the holding pawl and correspondingly the lower casing member is formed on the outer surface thereof with the slide groove, whereby the holding pawl of the lower plate is slidably fitted in the slide groove of the lower casing member. Also, in the disc cartridge of the present invention, the upper and lower casing members are so formed that the side surface of the lower casing member on which the connection plate of the shutter is slid is outwardly projected beyond the side surface of the upper casing member on which the connection plate is likewise slid. Alternatively or additionally, the shutter is so formed that a bending angle between the lower plate and the connection plate is larger than that between the upper plate and the connection plate. Such construction ensures smooth sliding of the shutter on the casing while keeping the connection plate of the shutter from being abutted against or in contact with the casing, leading to a safe and increased-in-reliability sliding operation of the shutter. Also, such construction prevents the shutter from being caught on the casing and/or shaving the casing irrespective of a variation in dimensions of the casing, a variation in angle of bending of the shutter and the like, so that the disc cartridge may exhibit increased reliability in operation thereof and enhance safety and reliability in both assembling and operation of the disc cartridge.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A disc cartridge comprising:

a casing constituted of an upper casing member and a lower casing member;

a disc medium rotatably received in said casing;

said casing being provided with openings through which a recording/reproducing device is accessible to said disc medium; and a shutter constructed of an upper plate, a lower plate and a connection plate for connecting said upper and lower plates;

said upper and lower plates being movably supported on said casing and moved in slide recesses formed on an outer surface of said casing to selectively close said openings;

said lower plate of said shutter being provided with a holding pawl;

said lower casing member being formed on an outer surface thereof with a slide groove;

said holding pawl of said lower plate being slidably fitted in said slide groove of said lower casing member;

said upper and lower casing members being so formed that a side surface of said lower casing member on which said connection plate of said shutter is slid is outwardly projected toward said connection plate of said shutter beyond a side surface of said upper casing member on which said connection plate is likewise slid.

2. A disc cartridge as defined in claim 1, wherein said connection plate of said shutter is provided thereon with a bent element extending inwardly from said connection plate; and said upper and lower casing members of said casing are formed on said side surfaces thereof with a recess;

said bent element of said connection plate being inserted in said recess of said side surfaces of said upper and lower casing members while being abutted against a recess forming portion of said lower casing member;

whereby said shutter is slidably arranged on said casing while straddling said upper and lower casing members.

3. A disc cartridge as defined in claim 1, wherein said shutter is so formed that a bending angle between said lower plate and said connection plate is larger than that between said upper plate and said connection plate.

4. A disc cartridge as defined in claim 2, wherein said shutter is so formed that a bending angle between said lower plate and said connection plate is larger than that between said upper plate and said connection plate.

5. A disc cartridge comprising:

a casing including an upper casing member and a lower casing member;

a disc medium rotatably received in said casing;

said casing being provided with openings through which a recording/reproducing device is accessible to said disc medium; and a shutter constructed of an upper plate, a lower plate and a connection plate for connecting said upper and lower plates;

said upper and lower plates being movably supported on said casing and moved in slide recesses formed on an outer surface of said casing to selectively close said openings;

wherein said upper and lower casing members are formed so that a side surface of said lower casing member on which said connection plate of said shutter is slid is outwardly projected toward said connection plate of said shutter beyond a side surface of said upper casing member on which said connection plate is likewise slid.

* * * * *